A. A. BENDER.
RESILIENT WHEEL.
APPLICATION FILED NOV. 27, 1916.
1,242,759.
Patented Oct. 9, 1917.
2 SHEETS—SHEET 1.
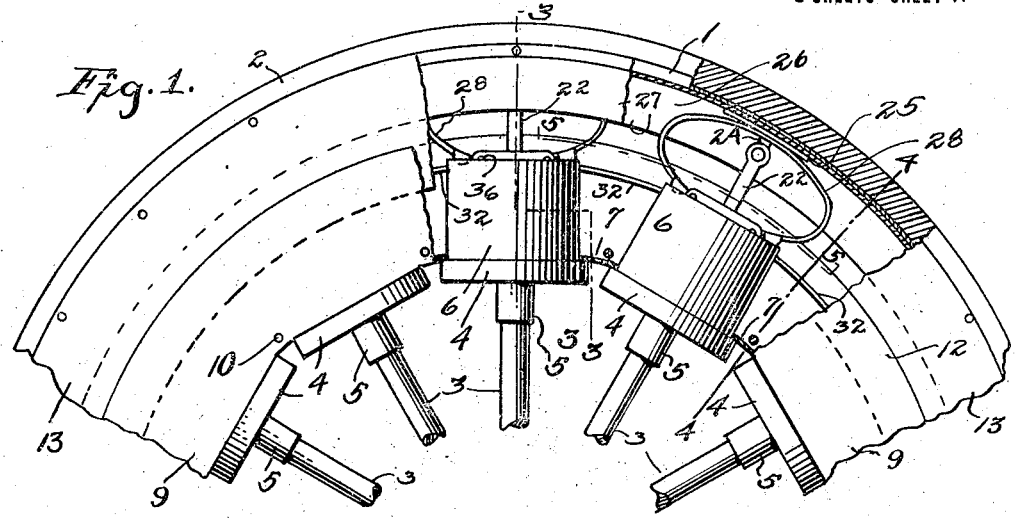
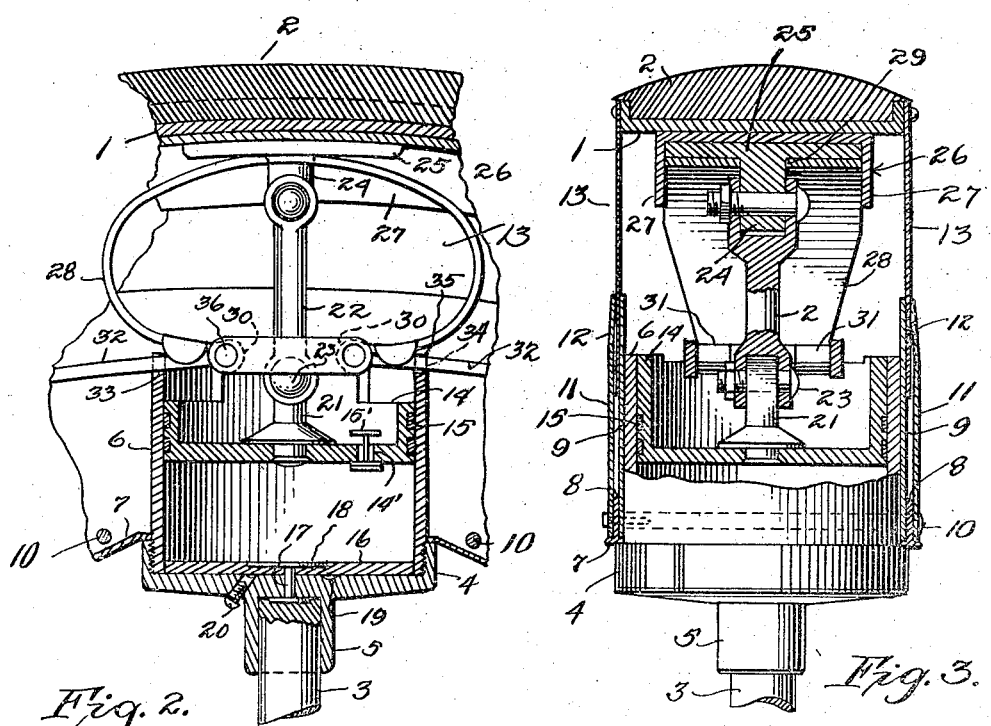
Inventor
A. A. Bender

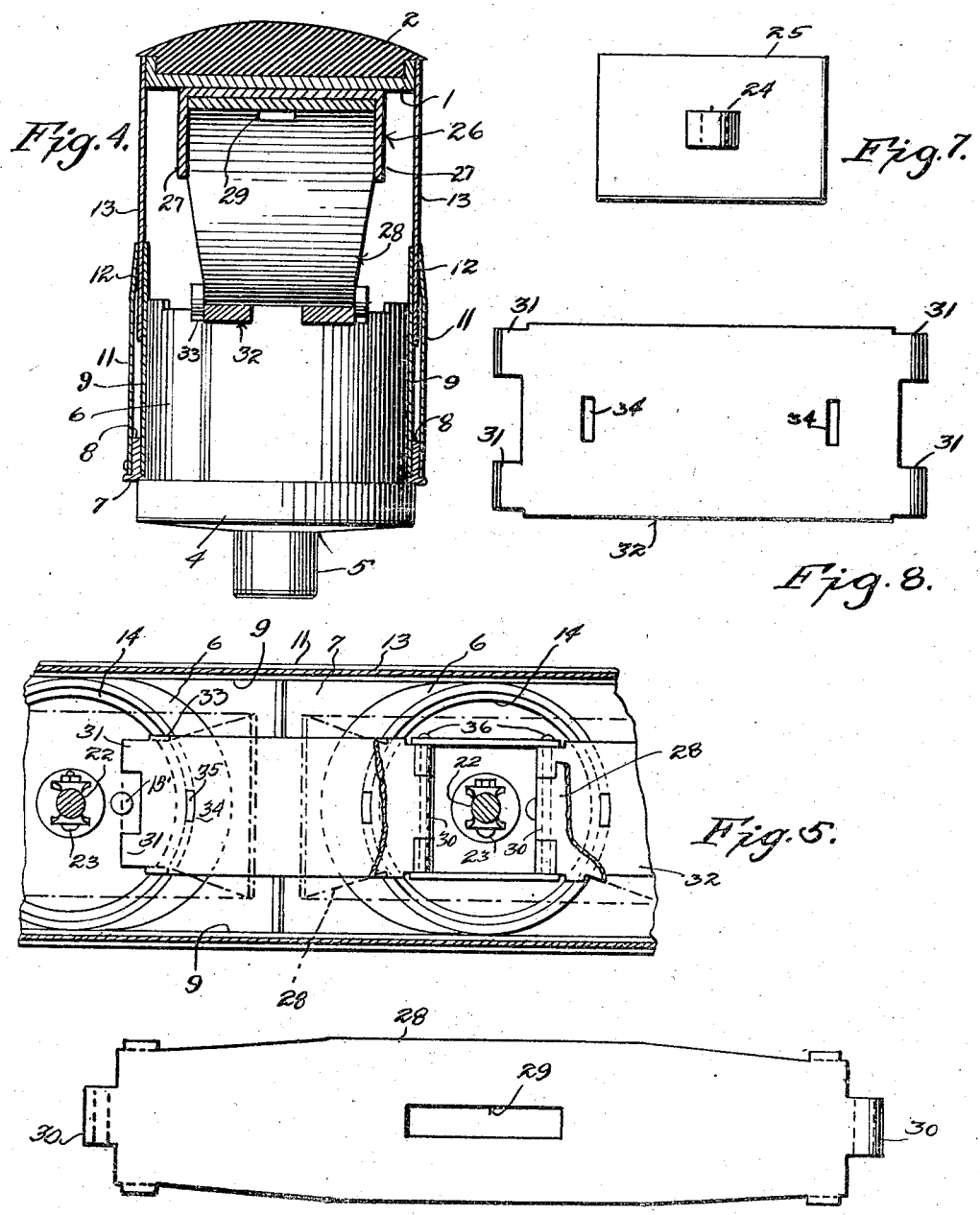

UNITED STATES PATENT OFFICE.

ADOLPH A. BENDER, OF PINEBLUFF, WYOMING, ASSIGNOR TO BENDER RESILIENT WHEEL MFG. COMPANY, OF PINEBLUFF, WYOMING, A CORPORATION OF WYOMING.

RESILIENT WHEEL.

1,242,759.            Specification of Letters Patent.        Patented Oct. 9, 1917.

Application filed November 27, 1916. Serial No. 133,659.

*To all whom it may concern:*

Be it known that I, ADOLPH A. BENDER, a citizen of the United States, residing at Pinebluff, in the county of Laramie, State of Wyoming, have invented certain new and useful Improvements in Resilient Wheels; and I do hereby declare the following to be a full, clear, and exact description of the invention, such as will enable others skilled in the art to which it appertains to make and use the same.

This invention belongs to the class of resilient wheels and has particular reference to those wheels in which pneumatic and spring elements are combined.

The principal object of the invention is to provide a resilient wheel in which the parts of the assemblage are of practical construction and combined to make a practical device. To this end, I have improved the construction of pneumatic piston cushion devices, and also of certain spring elements which are associated with the pneumatic cushion devices to provide the necessary resilience to the wheel. The pneumatic cushion devices and the springs, in carrying out another object of the invention are associated after an improved method so that while a complete annular arrangement of connected parts is provided, they are so flexibly and removably or interchangeably connected that the wheel is readily repaired or its parts restored when any one thereof is injured, and furthermore, this particular assemblage of parts provides a resilient wheel of increased efficiency in service and life.

A further object of the invention consists in the provision of a cushioning mechanism which is interposed between fixed supports upon the wheel spokes and a relatively movable rim, the relative movement of the rim being limited to that which is necessary to take up all jars due to starting and stopping, while the cushioning mechanism is so balanced that the relative movement is practically due to a laterally resilient connection instead of a mere sliding connection.

With the above objects in view and such other objects as will hereinafter appear, my invention will now be fully set forth and described, reference being had to the accompanying drawings.

In the drawings:—

Figure 1 is a part elevational and part sectional view of a wheel embodying my invention.

Fig. 2 is an enlarged longitudinal sectional view through one of the cushioning units and the corresponding parts of the wheel, Fig. 3 is a section on line 3—3 of Fig. 1, Fig. 4 is a section on line 4—4 of Fig. 1, Fig. 5 is a section on line 5—5 of Fig. 1, Fig. 6 is a plan view of a blank used in the construction of the spring elements, Fig. 7 is a plan view of the inner cushion support, and Fig. 8 is a plan view of a connecting element used in connection with the construction.

Referring more particularly to the drawings, 1 indicates a continuous annular rim formed to support a tire 2 of suitable contour. The rim 1 is supported upon the spokes 3 by means of a plurality of interposed cushioning units which not only connect the spokes and the rim, but are also annularly connected one to another so as to provide a continuous resilient structure around the wheel.

Mounted upon each one of the spokes 3 is a cylinder head 4, said heads 4 consisting of shallow cup-like structures whose under faces are provided with the bosses 5 in which the ends of the spokes 3 are socketed. Seated within the bases 4 are the cylinders 6, the latter also projecting through an inner rim 7. The latter is a continuous multisided element, the number of sides corresponding to the number of pistons, and each side resting upon the upper edge of the flanged portions of the bases 4, so that the spokes 3 and the cylinders 6 are united in a rigid unitary structure which prevents lateral movement of the spokes in any direction. Furthermore, the inner rim 7 is provided with the marginal outturned flanges 8 which lie outside of the cylinders 6 and serve as supports for the vertical walls or plates 9, whose annular formation provides a continuous inclosure for the cylinders, upon both sides of the wheel. The plates 9 are secured to the flanges 8 by means of the connecting rods 10 which are passed through the flanges and the plates and also extend entirely across the inner rim 7. Outside of the plates 9 and outside of the flanges 8 is mounted a pair of annular spring plates 11 which are also carried upon the connecting rods 10. Upon the outer faces of the flanged sides of the outer rim 1 are secured the annular plates 13 which extend inwardly from the outer rim and are engaged between the contacting edges of the annular plates 9 and 11 secured to the inner rim 7, so that the mechanism mounted between the two rims is entirely housed and protected from dirt and dust.

Each of the cylinders 6 is fitted with a piston 14 having rings 15 in order to provide a tight joint between the cylinders and the pistons. The piston 14 is provided with a port 14' through which extends the stem of a two headed valve 15' which regulates the air pressure within the cylinders. At the inner ends of their reciprocation in the cylinders, the pistons 14 come into contact with the oil pads 16 which are seated across the closed ends of the cylinders and are held in position by means of the studs 17 which extend through the heads of the cylinders and are riveted over the securing plates 18 within the cylinder. The oil pads 16 are formed of any suitable matted or woven material which will absorb and retain a quantity of oil, and are in a degree compressible so that the oil may be extracted by the pressure of air on the pads, so that the cylinders and the pistons will be maintained in a suitable state of lubrication. Below the pads 16 are formed the annular oil channels 19 to which communication is provided by means of the oil ducts or cups 20 entered through the heads of the cylinders.

The pistons 14 are provided with the connecting heads 21 to which are pivotally connected the piston rods 22, the piston rods 22 being connected to the connecting heads by means of the pins 23 to permit the rods to swing in the plane of the wheel. The opposite ends of the rods 22 are connected to the standards 24 of the shoes 25, the latter being slidably mounted against the inner face of a channeled member 26 which is seated upon the inner face of the outer rim 1 and has the inturned channeled walls 27 which stand closer together than the walls of the inner rim or the walls 13 of the outer rim. The walls 27 of the channeled member provide a guide way for the shoes 25 whose lateral edges are closely combined, and also provide guides and partial housings for the bowed springs 28.

As best seen in Fig. 6 the bowed springs 28 are formed from blanks of metallic spring bars which are widest at their middle points and fulcrum slightly toward their ends. The blanks are bowed downwardly and inwardly so that their ends stand in spaced relation to permit the projection of the piston rods 22 therebetween, and at their widest portions, the springs are also provided with longitudinal slots 29 through which the standards 24 of the shoes 25 project, so that a certain amount of radial play of the spring along the standards 24 is permitted, and relative circumferential movement between the springs 28 and shoes 25 is permitted. In bowing upwardly from the cylinders, the springs 29 bear against the rear faces of the shoes 25 and tend to hold them against the inner face of the channeled member 26. The inturned opposing free ends of the springs 28 are provided with the bosses 30 of reduced width, which lie below the ends of the springs, as best shown in Fig. 2 to be received between the spaced bearings or bosses 31 formed in spaced relation upon the ends of the connecting plates 32. The latter rest across the upper edge of adjacent cylinders 6, and are prevented from lateral movement thereon by being seated in the recesses 33, formed in the edges at diametrically opposite sides of the cylinders, and are furthermore provided with the openings 34 through which project lugs 35 which project upwardly from the middle points of the recesses 33, so as to lock the plates 32 in position. Pintles 36 pass through the bosses 30 and the bearings 31 successively around the wheel connecting all of the springs together, and coupling them to the cylinders 6, the pivotally connected ends of the springs overlying the cylinders, and the plates 32 having bearings upon each of the adjacent cylinders, so that the bearing points may successfully act as fulcrums for the plates 32 as the wheel revolves and pressure is applied continuously therearound. Inside of the bosses 30 upon each end of the springs 28, the springs are marginally provided with downturned or outturned lugs or guides 37 which are adapted to span the longitudinal edges of the plates 32 and thereby assist in maintaining the circumferential alinement of the plates and springs and resist the side strain due to travel of the wheel over a road.

From the foregoing description it will be apparent that I have invented a practical and efficient resilient wheel, in which a series of unitary cushioning devices is provided, the cushioning devices being interposed between inner and outer wheel rims so as to absorb all jar and vibration due to radial thrust, and that furthermore, the unitary cushioning devices and assemblages are so interlocked that they cooperate circumferentially to absorb the radial thrust and are also interconnected to avoid the action of side stresses upon individual cushioning units.

What I claim as my invention is:—

1. A resilient wheel comprising in combination, a rim, a plurality of spoke carried cylinders, pistons operative in said cylinders, slide shoes operative inside of said rim, piston rods pivoted to said pistons and to said slide shoes, springs interposed between said cylinders and said shoes, and plates pivotally connecting said springs into a continuous annular series.

2. A resilient wheel comprising in combination, a rim, a plurality of spoke carried cylinders, pistons operative in said cylinders, slide shoes operative inside of said rim, piston rods pivoted to said pistons and to said slide shoes, springs interposed between said cylinders and said shoes, and plates having fulcrumed bearings on adjacent cylinders and pivotally connecting said springs into an annular series.

3. In a resilient wheel construction, a cushioning structure comprising a cylinder, a head for said cylinder, a piston operative in the cylinder, an oil pad seated against the head of the cylinder, and wholly covering the inner face of the latter, an oil chamber in the head behind said pad and means for feeding oil to the chamber.

4. A resilient wheel comprising in combination, a rim, an annular chamber mounted upon the inner face of the rim, a plurality of spoke carried cylinders, pistons operative in said cylinders, slide shoes contained within and guided by said annular chamber, piston rods connecting said shoes and the respective pistons, bowed springs having their ends supported by the pistons and having longitudinal slots through which the piston rod connections project, said springs bearing against the shoes, and plates pivotally connecting said springs into a continuous annular series.

In testimony whereof, I affix my signature, in the presence of two witnesses.

ADOLPH A. BENDER.

Witnesses:
B. W. MARSHALL,
J. A. MENTZER.

Copies of this patent may be obtained for five cents each, by addressing the "Commissioner of Patents, Washington, D. C."